(12) United States Patent
Kagami et al.

(10) Patent No.: US 7,190,559 B2
(45) Date of Patent: Mar. 13, 2007

(54) THIN-FILM MAGNETIC HEAD HAVING THE LENGTH OF THE PINNED AND ANTIFERROMAGNETIC LAYERS GREATER THAN THE WIDTH DIMENSION THEREOF AND/OR THE LENGTH OF THE FREE LAYER

(75) Inventors: Takeo Kagami, Tokyo (JP); Noriaki Kasahara, Tokyo (JP)

(73) Assignee: TDK Corporation, Tokyo (JP)

( * ) Notice: Subject to any disclaimer, the term of this patent is extended or adjusted under 35 U.S.C. 154(b) by 405 days.

(21) Appl. No.: 10/652,517

(22) Filed: Sep. 2, 2003

(65) Prior Publication Data

US 2004/0061986 A1 Apr. 1, 2004

(30) Foreign Application Priority Data

Sep. 27, 2002 (JP) ............................. 2002-284158

(51) Int. Cl.
*G11B 5/39* (2006.01)
(52) U.S. Cl. .............................. 360/324.11; 360/324.12
(58) Field of Classification Search . 360/324.11–324.2
See application file for complete search history.

(56) References Cited

U.S. PATENT DOCUMENTS 6,381,107 B1 * 4/2002 Redon et al. ............. 360/324.2
6,636,395 B1 * 10/2003 Terunuma ............... 360/324.11
6,728,079 B2 * 4/2004 Shimazawa ................. 360/320
2004/0207962 A1 * 10/2004 Saito et al. ............ 360/324.11

FOREIGN PATENT DOCUMENTS

| JP | 7-272221 | 10/1995 |
| JP | 2000-311317 | 11/2000 |
| JP | A 2001-203408 | 7/2001 |

* cited by examiner

*Primary Examiner*—A. J. Heinz
(74) *Attorney, Agent, or Firm*—Oliff & Berridge, PLC

(57) ABSTRACT

In the thin-film magnetic head of the present invention, the length of each of a pinned layer and an antiferromagnetic layer in their contact area in the depth direction from a surface facing a medium is longer than the length of a free layer in the same direction. When the length of the pinned layer in the depth direction is set longer as such, the direction of magnetization of the pinned layer can be restrained from being tilted by disturbances. Also, the pinned layer and the antiferromagnetic layer have the same length in their contact area in the MR height direction, so that the pinned layer is in contact with the antiferromagnetic layer throughout its length in the MR height direction, thus raising the exchange coupling force, whereby the inclination in the direction of magnetization can be suppressed more effectively.

9 Claims, 7 Drawing Sheets

THIN-FILM MAGNETIC HEAD HAVING THE LENGTH OF THE PINNED AND ANTIFERROMAGNETIC LAYERS GREATER THAN THE WIDTH DIMENSION THEREOF AND/OR THE LENGTH OF THE FREE LAYER

BACKGROUND OF THE INVENTION

1. Field of the Invention

The present invention relates to a thin-film magnetic head, a head gimbal assembly, and a hard disk drive which read magnetic information of a hard disk or the like by utilizing a magnetoresistive effect.

2. Related Background Art

As a thin-film magnetic head for reading magnetic information of a hard disk, MR (MagenetoResistive) heads have been in use. The MR heads utilize a magnetoresistive effect in which the ohmic value of a magnetic body varies as an external magnetic field (e.g., a leakage magnetic field from the hard disk) changes when a current is caused to flow through the magnetic body. This magnetoresistive effect can substantially be realized by an MR film comprising a pinned layer whose direction of magnetization is fixed by exchange coupling with an antiferromagnetic layer, a free layer whose direction of magnetization varies depending on the external magnetic field, an intermediate layer disposed therebetween, and the like which are laminated. In a GMR (Giant MagnetoResistive) head utilizing a giant magnetoresistive effect, the intermediate layer is formed from an electrically conductive material such as Cu.

A constant sense current is supplied to the MR film of a magnetic head. As the angle between directions of magnetization of pinned layer and free layer is changed by the external magnetic field, the resistance to the sense current is minimized when the respective directions of magnetization of these layers coincide with each other and is maximized when their directions of magnetization are opposite from each other. Reading such a change in resistance as a voltage value can produce the magnetic information written in a hard disk.

Developed in the thin-film magnetic heads are the CIP (Current In Plane) structure in which the sense current flows in the surface direction of the MR film and the CPP (Current Perpendicular to Plane) structure in which the sense current flows in a direction (film thickness direction) perpendicular to the MR film. The CPP structure can use a magnetic shield layer itself as an electrode, thereby yielding no substantial short circuit (insulation failure) between the magnetic shield layer and the MR film, which may become a problem when narrowing the lead gap in the CIP structure. Therefore, the CPP structure is quite advantageous in enhancing the areal density of hard disks. Examples of heads employing the CPP structure include TMR (Tunneling MagnetoResistive) heads utilizing a magnetoresistive effect occurring at a tunnel junction and CPP-GMR heads (disclosed in Japanese Patent Application Laid-Open No. 2001-203408, for example).

SUMMARY OF THE INVENTION

However, conventional thin-film magnetic heads with the CPP structure may have the following problems. Namely, an MR head with the CPP structure attains a very small size with a track width of 0.2 µm or less and an MR height of 0.2 µm or less, for example, by various kinds of patterning, wrapping in a later step, and the like. As the areal density increases, the track width and MR height are expected to become smaller from now on. As the device size becomes smaller, the pinned layer of CoFe or the like whose direction of magnetization is fixed by an antiferromagnetic layer of PtMn or the like is more likely to tilt the direction of magnetization and generate pin inversions, because of annealing in a later step, external magnetic fields, and magnetic fields caused by the sense current, thereby yielding problems of output deterioration and the like.

For overcoming the above-mentioned problems, it is an object of the present invention to provide a thin-film magnetic head, head gimbal assembly, and hard disk drive having a pinned layer whose direction of magnetization is stable.

The present invention provides a thin-film magnetic head comprising an antiferromagnetic layer; a pinned layer, formed from a ferromagnetic material, having a direction of magnetization fixed by exchange coupling with the antiferromagnetic layer; a free layer, formed from a ferromagnetic material, having a direction of magnetization changeable depending on an external magnetic field; and an intermediate layer disposed between the pinned layer and the free layer; wherein a sense current flows through at least the intermediate layer and free layer in a layer thickness direction thereof; and wherein the pinned layer and antiferromagnetic layer have an identical length in a contact area therebetween in a depth direction from a surface facing a medium, the length being longer than a length of the free layer in the depth direction. The thin-film magnetic head becomes a so-called CPP-GMR head when the intermediate layer is formed from an electrically conductive from an insulating material.

In the thin-film magnetic head of the present invention, the length of each of the pinned layer and antiferromagnetic layer in their contact area in a depth direction (MR height direction) from a surface facing a medium is longer than that of the free layer in the same direction. The magnetization of the pinned layer is fixed to the MR height direction, a direction opposite therefrom, or the like, for example. When the length of the pinned layer in the depth direction is set longer as such, the demagnetizing field in the MR height direction is reduced, so that the magnetization in the height direction or in the direction opposite there from is stabilized, whereby the direction of magnetization of the pinned layer can be restrained from being tilted by disturbances.

Also, the pinned layer and the antiferromagnetic layer have the same length in their contact area-in-the MR height direction, so that the pinned layer is in contact with the antiferromagnetic layer throughout its length in the MR height direction, thus raising the exchange coupling force, whereby the inclination in the direction of magnetization can be suppressed more effectively.

The present invention provides a head gimbal assembly comprising the above-mentioned thin-film magnetic head mounted to a gimbal. The present invention provides a hard disk drive comprising a hard disk writable with magnetic information, and the above-mentioned thin-film magnetic head for reading the magnetic information from the hard disk.

Since the head gimbal assembly and hard disk drive in accordance with the present invention comprise the above-mentioned thin-film magnetic head, they can restrain the direction of magnetization of the pinned layer from tilting, thereby being able to enhance and stabilize the output of the hard disk drive.

In another aspect, the present invention provides a thin-film magnetic head comprising an antiferromagnetic layer; a pinned layer, formed from a ferromagnetic material, having a direction of magnetization fixed by exchange coupling with the antiferromagnetic layer; a free layer, formed from a ferromagnetic material, having a direction of magnetization changeable depending on an external magnetic field; and an intermediate layer disposed between the pinned layer and the free layer; wherein a sense current flows through at least the intermediate layer and free layer in a layer thickness direction thereof; and wherein the pinned layer and antiferromagnetic layer have an identical length in a contact area therebetween in a depth direction from a surface facing a medium, the length being longer than a length of the contact-area in a width direction thereof.

In such a thin-film magnetic head, the length of each of the pinned layer and antiferromagnetic layer in their contact area in the MR height direction is longer than that of the contact area in the width direction thereof. When the length of the pinned layer in the depth direction is set longer as such, the demagnetizing field in the MR height direction is reduced, so that the magnetization in the height direction or in the direction opposite therefrom is stabilized, whereby the direction of magnetization of the pinned layer can be restrained from being tilted by disturbances.

Also, the pinned layer and the antiferromagnetic layer have the same length in their contact area in the MR height direction, so that the pinned layer is in contact with the antiferromagnetic layer throughout its length in the MR height direction, thus raising the exchange coupling force, whereby the inclination in the direction of magnetization can be suppressed more effectively.

The head gimbal assembly and hard disk drive comprising such a thin-film magnetic head can restrain the direction of magnetization of the pinned layer from tilting, thereby being able to enhance and stabilize the output of the hard disk drive.

BRIEF DESCRIPTION OF THE DRAWINGS

The present invention may be more readily described with reference to the accompanying drawings, in which.

DESCRIPTION OF THE PREFERRED EMBODIMENTS

In the following, preferred embodiments of the thin-film magnetic head, head gimbal assembly, and hard disk drive in accordance with the present invention will be explained in detail with reference to the accompanying drawings. Constituents identical to each other will be referred to with numerals identical to each other, without repeating their overlapping explanations.

Figure 1:
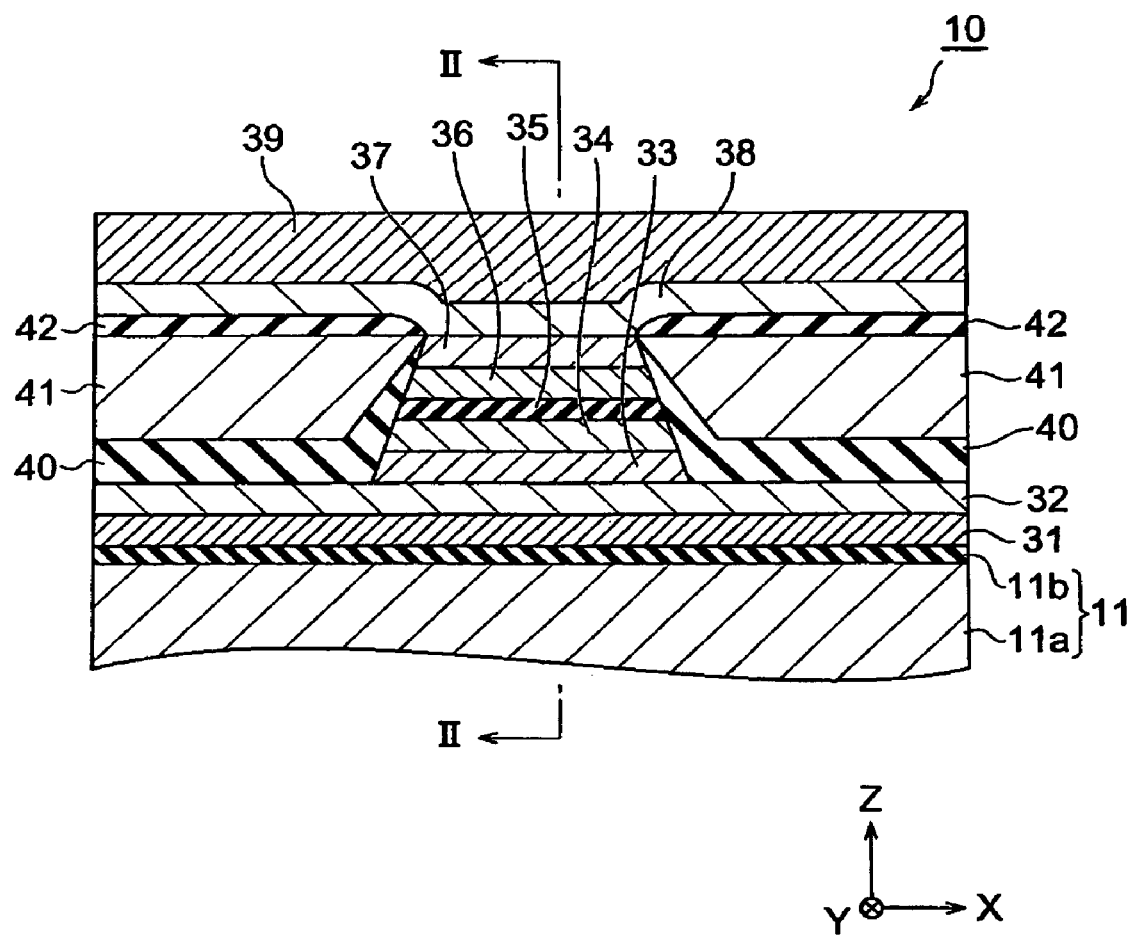
FIG. 1 is a sectional view showing an embodiment of the thin-film magnetic head in accordance with the present invention.
Figure 2:
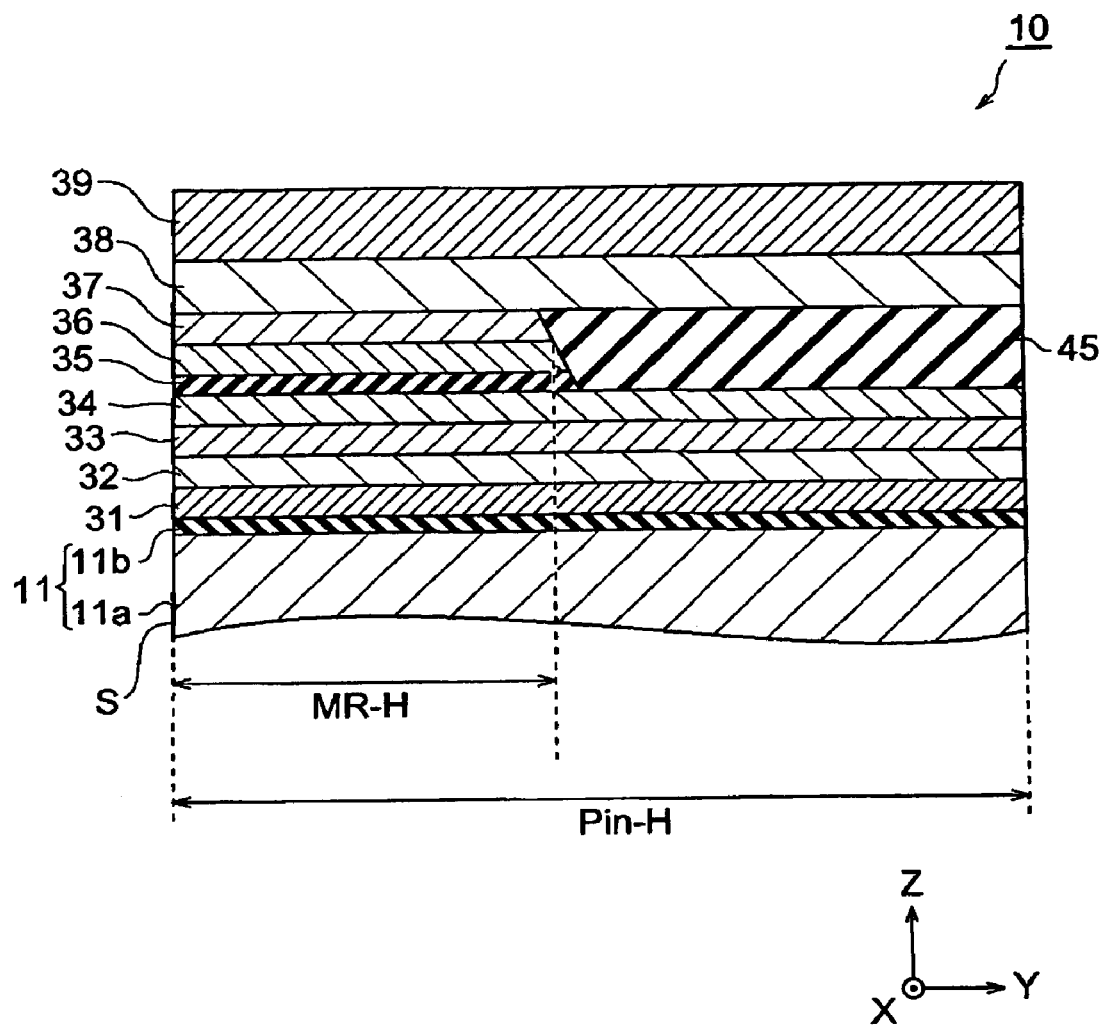
FIG. 2 is a sectional view of the thin-film magnetic head taken along the line II—II of FIG. 1.

FIG. 1 is a sectional view of the thin-film magnetic head in accordance with an embodiment in a part near a position slightly inside of a surface (hereinafter referred to as "air bearing surface (ABS) S") facing a recording medium, whereas FIG. 2 is a sectional view taken along the line II—II of FIG. 1. Terms "upper" and "lower" used in the explanation correspond to upper and lower directions in FIG. 1, respectively.

A thin-film magnetic head 10 is a TMR head utilizing a magnetoresistive effect occurring at a tunnel junction. The thin-film magnetic head 10 comprises a support 11, and a lower shield layer 31 also acting as a lower electrode, a lower metal layer 32, a pinning layer (antiferromagnetic layer) 33, a pinned layer 34, a tunnel barrier layer (intermediate layer) 35, a free layer 36, a first upper metal layer 37, a second upper metal layer 38, and an upper shield layer 39 also acting as an upper electrode which are laminated in this order on the support 11. By way of insulating layers 40, 40, bias application layers 41, 41 made of a hard magnetic material are formed on both sides of the free layer 36. Insulating layers 42, 42 are formed between the bias application layers 41, 41 and the second upper metal layer 38.

The support 11 is constituted by a substrate 11a made of AlTiC ($Al_2O_3$.TiC), and an undercoat layer 11b formed thereon with a thickness of about 1 µm to about 10 µm, which is made of an electrically insulating material such as alumina ($Al_2O_3$).

The lower shield layer 31 and upper shield layer 39 are made of a magnetic material such as NiFe (permalloy), and prevent the TMR device from sensing unnecessary external magnetic fields. Each of the shield layers 31, 39 has a thickness of about 1 µm to about 3 µm, for example. Here, as mentioned above, the lower shield layer 31 also acts as an electrode, whereby an electron supplied from the lower shield layer 31 passes through the lower metal layer 32, pinning layer 33, pinned layer 34, tunnel barrier layer 35, free layer 36, first upper metal layer 37, and second upper metal layer 38, so as to be transmitted to the upper shield layer 39 acting as the upper electrode. Namely, the sense current flows through at least the free layer 36 and intermediate layer in their layer thickness direction.

The lower metal layer 32, first upper metal layer 37, and second upper metal layer 38 are used for adjusting the lead gap corresponding to the areal density of the recording medium to a desirable value. The upper metal layers 37, 38 act to prevent the free layer 36 and the like from oxidizing. Examples of the material forming the metal layers 32, 37, 38 include Cu, Al, Au, Ta, NiCr, Ru, and Rh. Each metal layer may have a multilayer structure as well.

The pinning layer 33 has a thickness of about 5 nm to about 30 nm and can be formed from an antiferromagnetic material such as PtMn, for example, which can fix the direction of magnetization of the pinned layer 34 by exchange coupling.

The pinned layer 34 has a thickness of about 1 nm to about 10 nm and can be formed from a ferromagnetic material such as Fe, Co, Ni, or CoFe, for example. Upon exchange coupling with the pinning layer 33, the direction of magnetization of the pinned layer 34 is fixed to the direction of arrow Y in the drawings (or the direction opposite therefrom).

The tunnel barrier layer 35 is thin, nonmagnetic, and insulating, whereas electrons can pass therethrough while storing their spins by a tunneling effect. The tunnel barrier layer 35 has a thickness of about 0.5 nm to about 2 nm, and can be formed from an insulating material such as $Al_2O_3$, NiO, MgO, $Ta_2O_5$, or $TiO_2$, for example.

The free layer 36 changes its direction of magnetization under the influence of a leakage magnetic field from a recording medium such as hard disk. The free layer 36 has a thickness of about 1 nm to about 10 nm, and can be formed from a ferromagnetic material such as Fe, Co, Ni, FeCo, FeCoNi, or CoZrNb, for example. Magnetic fluxes from the upper bias application layers 41, 41 made of CoTa, CoCrPt, CoPt, or the like cause the free layer 36 to attain a single domain in the direction of arrow X in the drawings. As the air bearing surface S approaches a magnetization transition area of the hard disk, the direction of magnetization of the free layer 36 shifts so as to approach the positive or negative direction of Y axis. When the direction of magnetization of pinned layer 34 aligning with the Y axis and the direction of magnetization of the free layer 36 coincide with each other as a result of the shifting of the latter, the current flowing through the tunnel barrier layer 35 increases. When their directions of magnetization become opposite from each other, on the other hand, the current decreases.

The insulating layer 40 is formed from $Al_2O_3$ or the like and prevents the current flowing through the free layer 36 or the like from leaking toward the bias application layer 41. The insulating layer 42 can also be formed from $Al_2O_3$ or the like, for example, and prevents the current from leaking from the upper shield layer 39 to the bias application layer 41.

Figure 3:
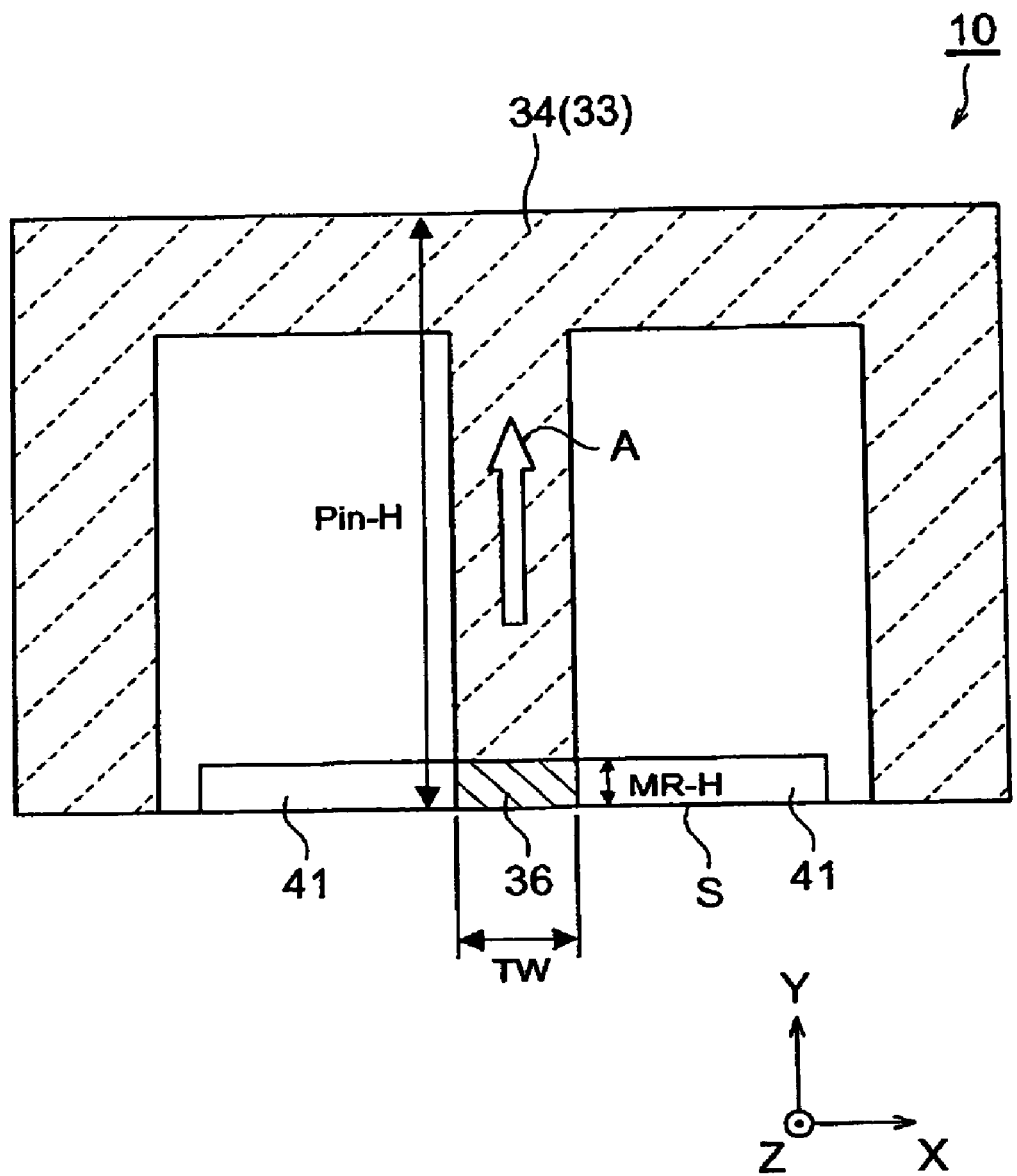
FIG. 3 is a view schematically showing the positional relationship between a free layer, bias application layers, a pinning layer, and a pinned layer.

FIG. 3 is a view showing the thin-film magnetic head 10 as seen from the upper side in FIG. 1, and schematically illustrating the positional relationship between the free layer 36, bias application layers 41, 41, pinning layer 33, and pinned layer 34. Arrow A in the drawing indicates the direction of magnetization fixed in the pinned layer 34. TW refers to the reading track width of the MR film including the free layer. MR-H refers to the length (so-called MR height) of the MR film from the air bearing surface S in the depth direction (Y direction). Pin-H refers to the length of the pinned layer 34 from the air bearing surface S in the depth direction (Y direction). As depicted, in the area between the bias application layers 41, 41, the pinned layer 34 hatched with broken lines has a width of TW until it reaches a region advanced to a certain extent in Y direction from the air bearing surface S, and expands its width in the X-direction on the deeper side. However, the width of the pinned layer 34 on the deeper side in Y direction maybe on a par with that on the air bearing surface S side as well.

Here, in the contact area between the pinned layer 34 and pinning layer 33, the length (Pin-H) of each layer from the air bearing surface S in the depth direction (direction of MR height) is longer than the length (MR-H) of the free layer 36 in this direction as shown in FIGS. 2 and 3 in this embodiment. When the length of the pinned layer 34 in the depth direction is set longer as such, the demagnetizing field in the MR height direction is reduced, so that the magnetization in the height direction or in the direction opposite therefrom is stabilized, whereby the direction of magnetization of the pinned layer 34 can be restrained from being tilted by disturbances. For making such effects remarkable, it will be preferred if the above-mentioned Pin-H is at least six times the depth of the free layer 36. In the making of the thin-film magnetic head, side walls of layers patterned by etching and the like may taper, such that a lower layer may become wider than an upper layer when there are a plurality of layers. In the example shown in FIG. 2, for instance, the length in the MR height direction slightly increases in ascending order of the upper metal layer 37, free layer 36, and tunnel barrier layer 35. The configuration in which the Pin-H is longer than the free layer 36 in the MR height direction in the present invention does not mean to include such a case of tapering by simple patterning.

As shown in FIG. 2, in the contact area between the pinned layer 34 and the pinning layer (antiferromagnetic layer) 33, the layers have an identical length in the depth direction from the air bearing surface S. Namely, the pinned layer 34 and the pinning layer 33 overlay each other such that their opposing surfaces are not exposed. Therefore, the pinned layer 34 is in contact with the pinning layer 33 throughout its length in the MR height direction, thus raising the exchange coupling force, whereby the inclination in the direction of magnetization can be suppressed more effectively.

From a different viewpoint, as shown in FIG. 3, the length (Pin-H) of each of the pinned layer 34 and pinning layer 33 in their contact area in the depth direction is longer than the length of the pinned layer 34 (more specifically the contact area between the pinned layer 34 and pinning layer 33) in the width direction. When the length of the pinned layer 34 in the depth direction is set longer as such, the demagnetizing field in the MR height direction is reduced, so that the magnetization in the height direction or in the direction opposite therefrom is stabilized, whereby the direction of magnetization of the pinned layer 34 can be restrained from being tilted by disturbances. For making such an effect remarkable, it will be preferred if the above-mentioned Pin-H is at least five times the length of the contact area between the pinned layer 34 and pinning layer 33 in the width direction.

With reference to FIGS. 4A to 4D and 5A to 5D, a method of making the thin-film magnetic head in accordance with this embodiment will now be explained. FIGS. 4A to 4D are sectional views showing steps of making the thin-film magnetic head, whereas FIGS. 5A to 5D are plan views corresponding to the respective steps of FIGS. 4A to 4D. The steps of FIGS. 4A to 4D correspond to the sections taken along the lines A—A, B—B, C—C, and D—D in FIGS. 5A to 5D, respectively. Though each drawing shows only one device, a plurality of thin-film magnetic heads are prepared from a single substrate in general.

Figure 4A:
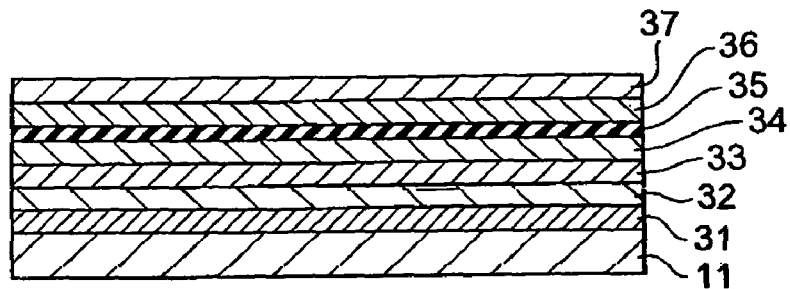
FIGS. 4A to 4D are sectional views showing manufacturing steps of the thin-film magnetic head.
Figure 5A:
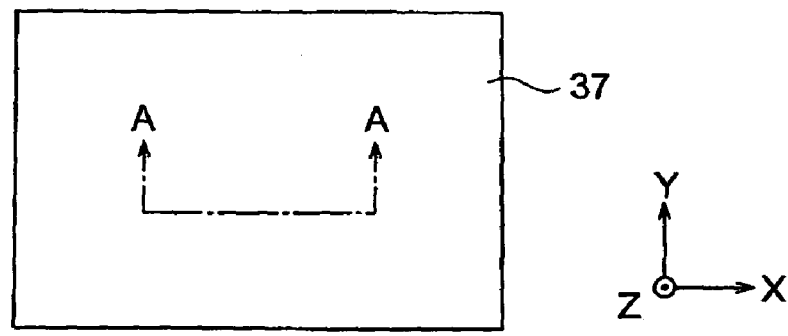
FIGS. 5A to 5D are plan views corresponding to the steps of FIGS. 4A to 4D, respectively.

First, in the step shown in FIGS. 4A and 5A, layers to become a lower shield layer 31, a lower metal layer 32, a pinning layer 33, a pinned layer 34, a tunnel barrier layer 35, a free layer 36, and a first upper metal layer 37 are successively formed with their predetermined thicknesses on a support 11 comprising a substrate made of AlTiC and an undercoat layer made of an insulating material formed thereon. For example, the lower shield layer 31 may be formed by wet plating, and the other layers may be formed by sputtering, though various other known techniques are employable. For making a desirable magnetic field in layers, they may be formed while applying a magnetic field thereto when necessary, or subjected to heat treatment after being formed, as publicly known.

Figure 4B:
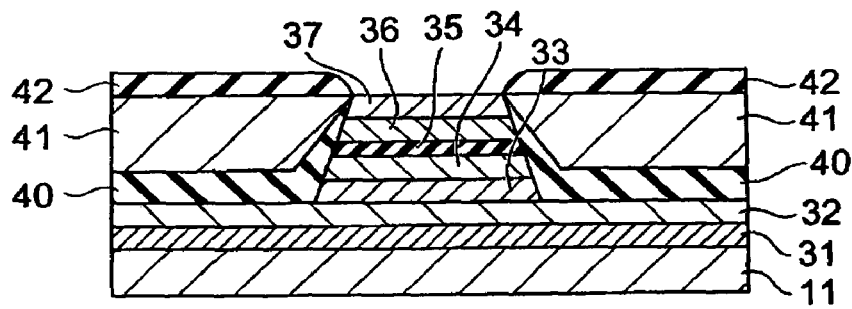
Figure 5B:
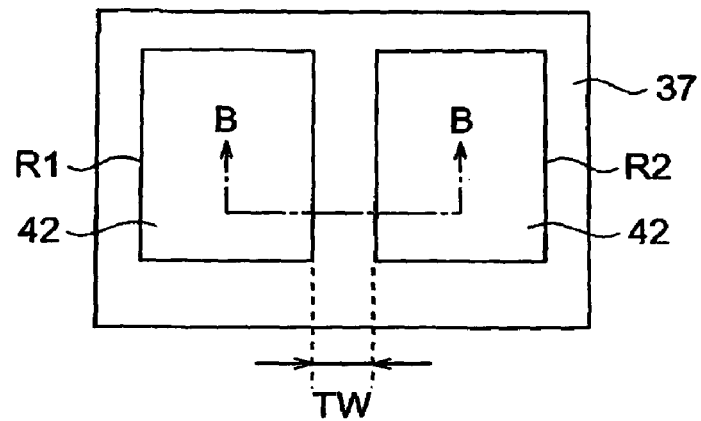

The next step will be explained with reference to FIGS. 4B and 5B. Thus formed intermediate of the thin-film magnetic head is formed with a mask exposing therethrough two regions R1, R2 separated from each other by a distance of TW. The mask is formed by the steps of coating the intermediate surface with a resist polymerizable upon irradiation with light or electron beams, irradiating the resist with light or electron beams, and developing thus irradiated resist. When the mask is formed, the first upper metal layer 37, which is the topmost layer of the intermediate, is exposed through the regions R1, R2. Subsequently, the exposed area is eliminated by ion milling or the like from the surface layer side of the intermediate to the surface of the lower metal layer 32. Then, while the mask remains, an insulating layer 40, a bias application layer 41, and an insulating layer 42 are successively laminated on the whole surface of the intermediate. Thereafter, the mask is peeled off, so as to effect liftoff, thereby removing the materials deposited on the mask. Here, as shown in FIG. 5B, the uppermost layer of the intermediate is the insulating layer 42 in the regions R1, R2, and the first upper metal layer 37 in the other region.

Figure 4C:
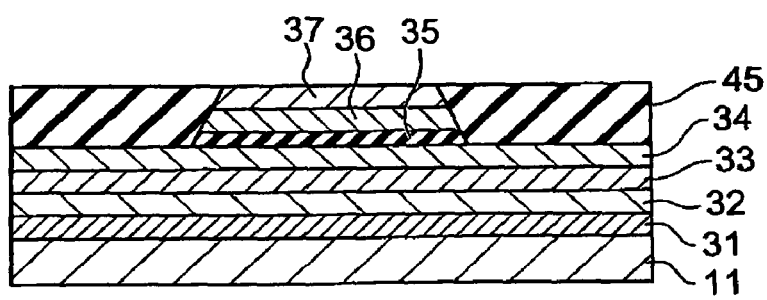
Figure 5C:
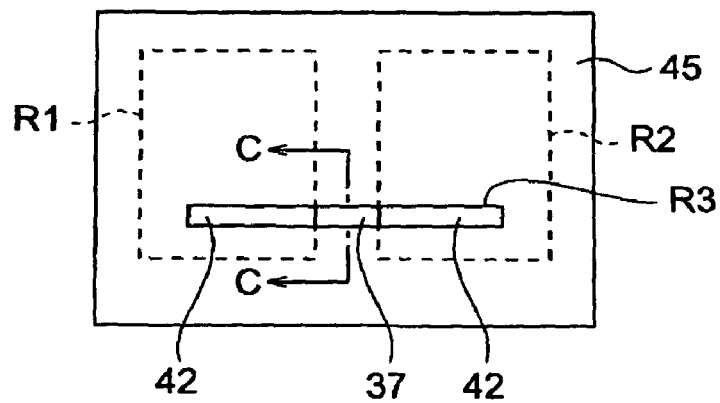

The next step will be explained with reference to FIGS. 4C and 5C. First, a mask is formed in an elongated region R3 extending in the X direction on the surface of the intermediate. This mask is formed so as to bridge the regions R1, R2. While the mask remains, the exposed area is eliminated by ion milling or the like to the surface of the pinned layer 34. Namely, ion milling is stopped about when the exposed area of the tunnel barrier is removed (or slightly left), whereby the length of each of the pinned layer 34 and pinning layer 33 in the MR height direction can be made longer than that in the free layer 36 in the same direction. Subsequently, while the mask remains, an insulating layer 45 is formed over the whole surface of the intermediate. Thereafter, the mask is peeled off, so as to effect lift off, thereby removing the materials deposited on the mask. Here, the uppermost layer of the intermediate is the first upper metal layer 37 in the center part in the width direction of the region R3, the insulating layer 42 on both sides thereof, and the insulating layer 45 in the region other than the region R3.

Figure 4D:
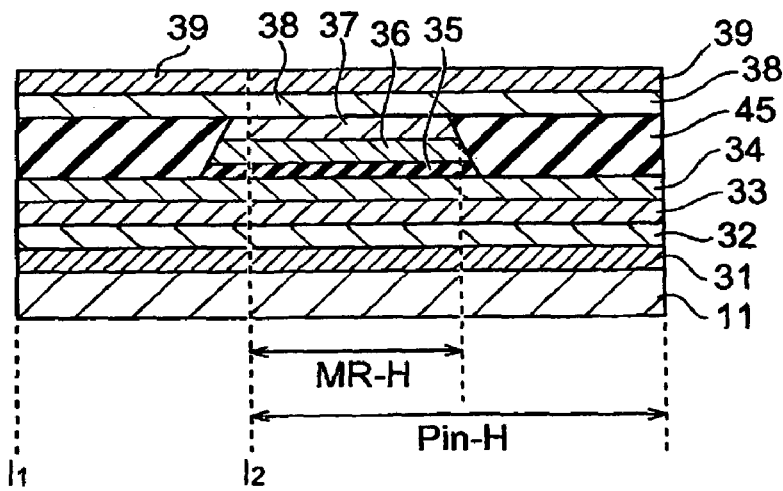
Figure 5D:
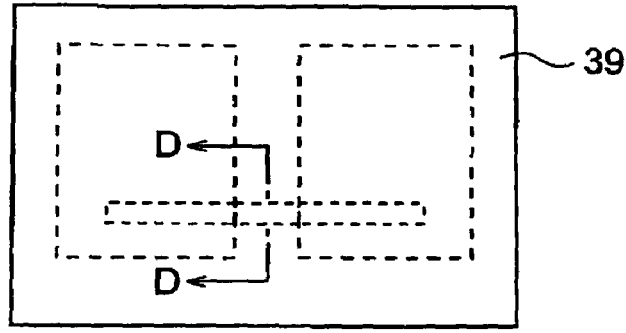

The next step will be explained with reference to FIGS. 4D and 5D. On the whole surface of the intermediate of the thin-film magnetic head obtained as mentioned above, a second upper metal layer 38 and an upper shield layer 39 are laminated in this order. For example, the second upper metal layer 38 may be formed by sputtering, and the upper shield layer 39 may be formed by wet plating. As in the foregoing, a reproducing head part of thin-film magnetic head is obtained.

Though not explained in detail, an inductive recording head part is formed on the reproducing head part. The recording head part may be of in-plane recording type in which a thin-film coil is held between upper and lower magnetic poles, or of perpendicular recording type in which a thin-film coil is held between main and auxiliary magnetic poles.

After the intermediate of the thin-film magnetic head is formed on the support 11, a plurality of bars are prepared therefrom by dicing. Each bar has a plurality of intermediates of thin-film magnetic heads arranged in parallel. At the stage where such bars are prepared, lapping (grinding) for adjusting the MR height is carried out. The lapping is started from broken line $l_1$ toward broken line $l_2$ shown in FIG. 4D, and is terminated when the distance from the lapped surface to the rear end of the MR film equals a predetermined MR height (MR-H). After the lapping is finished, each bar is cut into blocks each having a thin-film magnetic head, and a slider rail is formed, so as to yield a so-called head slider. This completes a series of manufacturing steps for the thin-film magnetic head 10.

Though the above-mentioned embodiment relates to a case where the thin-film magnetic head 10 is a TMR head, the thin-film magnetic head may be a GMR having so-called CPP structure. CPP-GMR refers to a GMR (Giant MagnetoResistive) head utilizing a giant magnetoresistive effect, in which a sense current flows in a direction (film thickness direction) perpendicular to the MR film. In this case, it will be sufficient if the intermediate layer disposed between the free layer 36 and the pinned layer 34 is formed from a nonmagnetic electrically conductive material such as Cu instead of the tunnel barrier layer 35 made of an insulating material. The sense current flows through at least the free layer 36 and intermediate layer in their layer thickness direction.

A head gimbal assembly and hard disk drive comprising the above-mentioned thin-film magnetic head 10 will now be explained.

Figure 6:
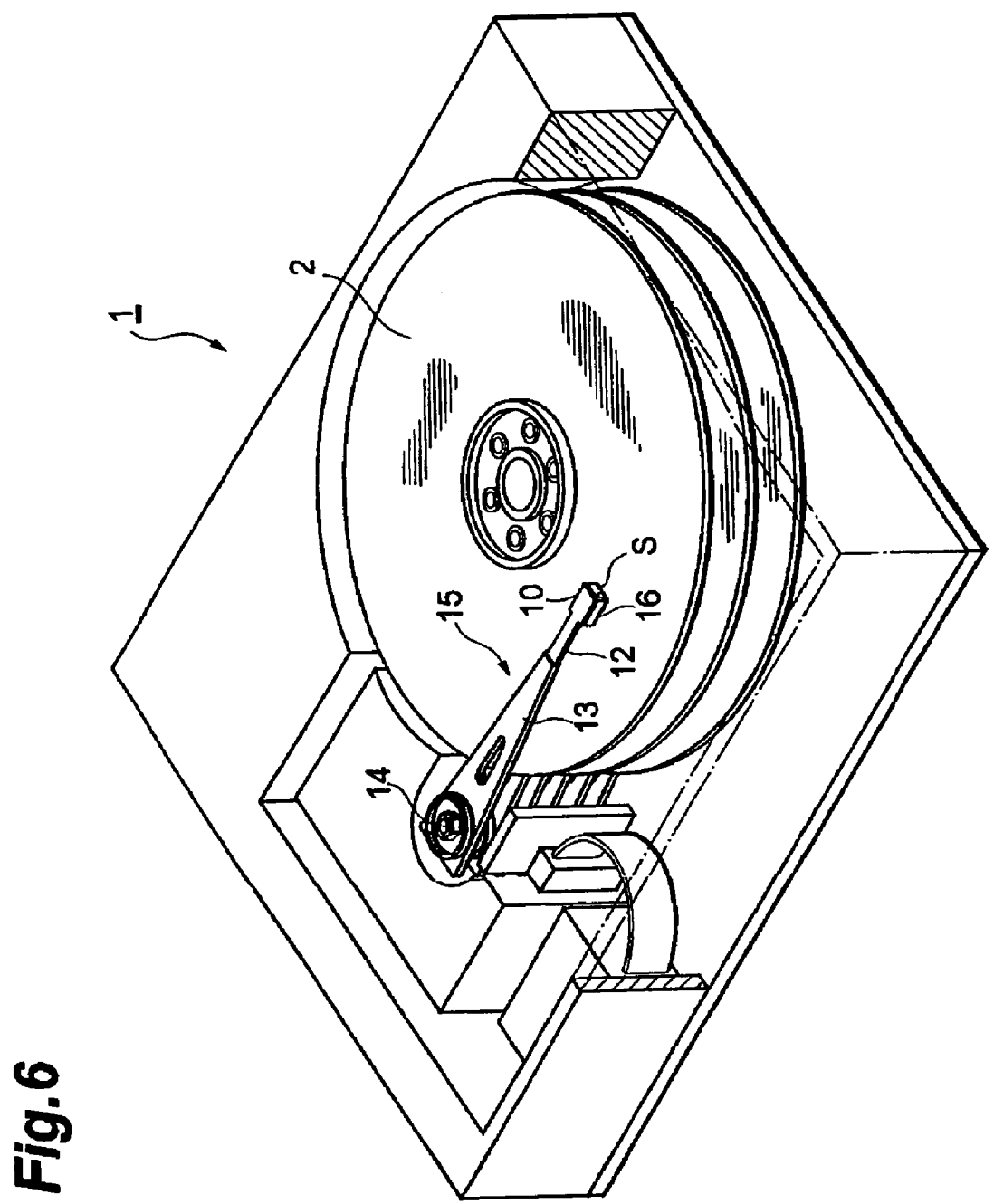
FIG. 6 is a perspective view showing an embodiment of the hard disk drive in accordance with the present invention.

FIG. 6 is a view showing a hard disk drive equipped with the thin-film magnetic head 10. The hard disk drive 1 actuates a head gimbal assembly (HGA) 15, thereby causing the thin-film magnetic head 10 to record and reproduce magnetic information with respect to a recording surface of a hard disk 2 rotating at a high speed. The head gimbal assembly 15 comprises a gimbal 12 mounted with a head slider 16 formed with the thin-film magnetic head 10, and a suspension arm 13 connected thereto, while being rotatable about a shaft 14 by a voice coil motor, for example. As the head gimbal assembly 15 is rotated, the head slider 16 moves radially of the hard disk 2, i.e., in a direction traversing track lines.

Figure 7:
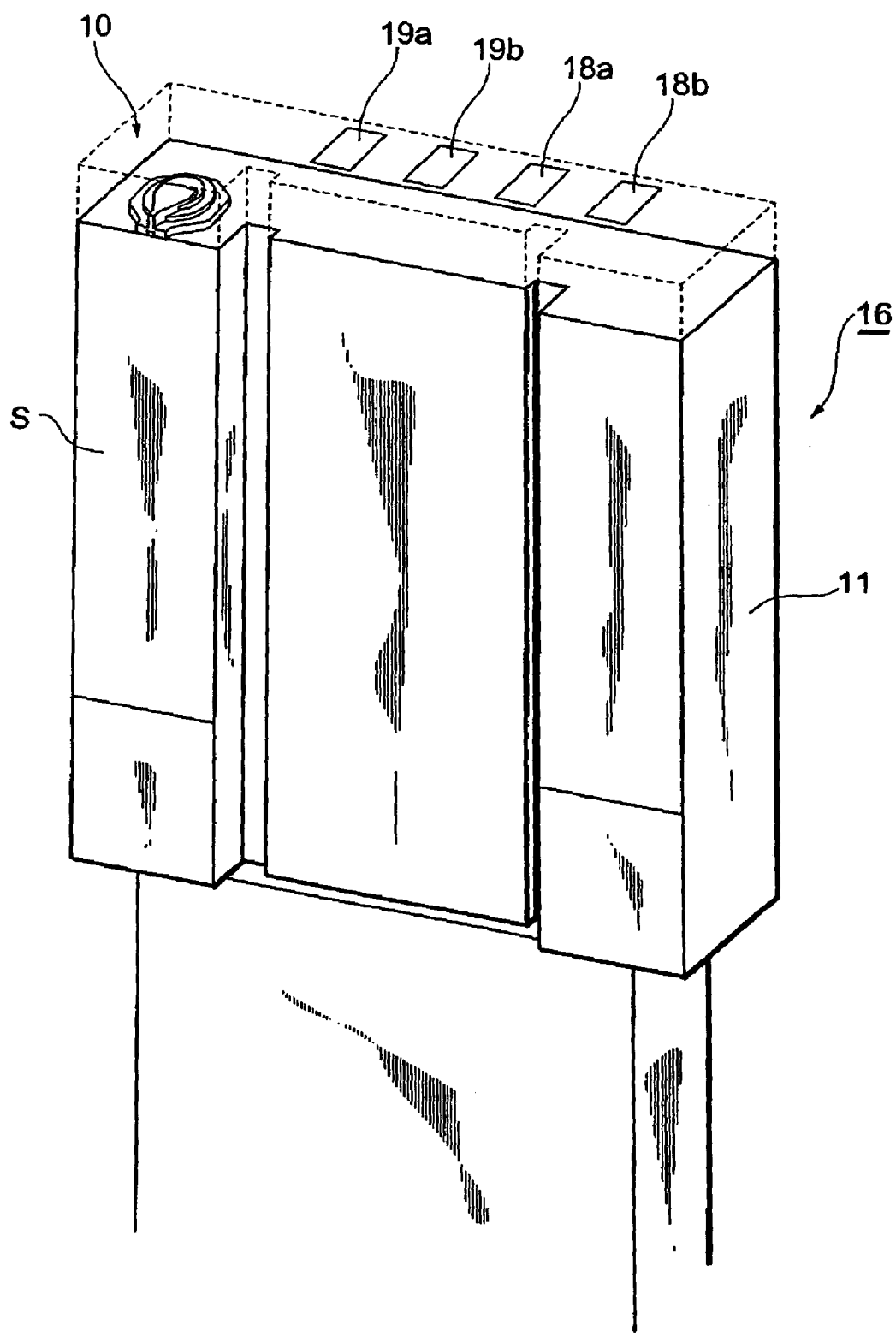
FIG. 7 is an enlarged perspective view showing the head slider mounted in the hard disk drive of FIG. 6.

FIG. 7 is an enlarged perspective view of the head slider 16. The head slider 16 has a substantially rectangular parallelepiped form in which the thin-film magnetic head 10 is formed on the support 11. The front-side surface in this drawing is the air bearing surface S opposing the recording surface of the hard disk 2. As the hard disk 2 rotates, an airflow accompanying the rotation levitates the head slider 16, thereby separating the air bearing surface S from the recording surface of the hard disk 2. Recording pads 18a, 18b and reproducing pads 19a, 19b are connected to the thin-film magnetic head 10. Wires (not depicted), to be connected to the individual pads, for inputting and outputting electric signals are attached to the suspension arm 13 shown in FIG. 6. The recording pads 18a, 18b are electrically connected to the thin-film magnetic head of the recording head part, whereas the reproducing pads 19a, 19b are electrically connected to the upper shield layer 39 and lower shield layer 31 of the TMR device, respectively.

Such head gimbal assembly 15 and hard disk drive 1 comprise the above-mentioned thin-film magnetic head 10, thus being able to restrain the direction of magnetization of the pinned layer from tilting, thereby making it possible to enhance and stabilize the output of the hard disk drive 1.

EXAMPLE

Effects of the present invention will now be explained specifically with reference to an example.

First, as the example, the thin-film magnetic head (TMR) having the configuration shown in Table 1 was prepared. The numerals shown in this table correspond to those in FIGS. 1 and 2. When a layer has a multilayer structure, the sublayers therein are listed while being separated from each other by slashes, so that they are shown in ascending order from the left side.

In this example, in the contact area between the pinned layer (CoFe/Ru/CoFe) and the pinning layer (PtMn), the height (Pin-H) of each layer in the MR height direction was made longer than the length (MR-H) of the free layer (CoFe/NiFe) 36 in the same direction. Also, in the contact area between the pinned layer (CoFe/Ru/CoFe) and the pinning layer (PtMn), these layers were made to have the same length in the MR height direction.

TABLE 1

| NUMERAL | LAYER NAME | FORMING MATERIAL |
|---|---|---|
| 39 | UPPER SHIELD LAYER | NiFe (2 µm) |
| 38 | 2ND UPPER METAL LAYER | Ta (3 nm) |
| 45 | INSULATING LAYER | $Al_2O_3$ (60 nm) |
| 41 | BIAS APPLICATION LAYER | TiW (10 nm)/CoPt (30 nm)/Ta (50 nm) |
| 40 | INSULATING LAYER | $Al_2O_3$ (10 nm) |
| 37 | 1ST UPPER METAL LAYER | Ta (25 nm) |
| 36 | FREE LAYER | CoFe (1 nm)/NiFe (3 nm) |
| 35 | TUNNEL BARRIER LAYER (INTERMEDIATE LAYER) | $Al_2O_3$ (0.6 nm) |
| 33, 34 | PINNING LAYER, PINNED LAYER | PtMn (15 nm)/CoFe (2 nm)/Ru (0.8 nm)/CoFe (3 nm) |
| 32 | LOWER METAL LAYER | Ta (5 nm)/NiFe (2 nm) |
| 31 | LOWER SHIELD LAYER | NiFe (2 µm) |

On the other hand, as a comparative example, a thin-film magnetic head (TMR) in which the length of the pinned layer (CoFe/Ru/CoFe) in the MR height direction was the same as that of the free layer was prepared. When preparing this head, ion milling was not stopped at the surface of the pinned layer in the step shown in FIG. 4C, but the pinned layer 34 and pinning layer 33 were also removed.

Also, 40 pieces each of the thin-film magnetic heads in accordance with the example and comparative example were prepared. In each of the example and comparative example, the track width TW was 0.13 µm, whereas the length of the free layer in the MR height direction was 0.10 µm. In the example, the length (Pin-H) of each of the pinned layer and pinning layer in their contact area in the MR height direction was 0.6 µm.

Then, while applying a magnetic field of ±400 [Oe] to each thin-film magnetic head in the MR height direction, the ratio of pin inversion in the pinned layer (see Table 2) and the magneto resistance change ratio (see Table 3) were measured. In this case, only the case where the direction of magnetization rotated by 180° (i.e., the case where it was completely reversed) was considered to yield no pin inversions, whereas cases where the magnetization fixed to the Y direction shown in FIG. 3, for example, rotated by an angle greater than 90°, thereby tilting in the –Y direction were determined as those generated pin inversions. As shown in Table 2, none of the total of 40 thin-film magnetic heads in accordance with the example yielded pin inversions. By contrast, 3 out of the total of 40 thin-film magnetic heads in accordance with the comparative example yielded pin inversions. Namely, pin inversions occurred at a ratio of 7.5%.

TABLE 2

| | EXAMPLE | COMPARATIVE EXAMPLE |
|---|---|---|
| NUMBER OF PIECES WITH PIN INVERSION | 0 | 3 (7.5%) |

Also, as shown in Table 3, the average value of magnetoresistance change ratio in the example was 15.5%, which was higher than the value of 13.2% in the comparative example. This is presumed to be because the direction of magnetization of the pinned layer is harder to shift from a predetermined direction. In this example, the experiment was carried out with the Pin-H at 0.6 µm, while the length of the free layer in the MR height direction was 0.1 µm. However, the demagnetizing field becomes lower as the Pin-H is longer, whereby the Pin-H at about 0.6 µm or greater can prevent pin inversions of the pinned layer from occurring and attain a higher magnetoresistance change ratio.

TABLE 3

| | EXAMPLE | COMPARATIVE EXAMPLE |
|---|---|---|
| MAGNETORESISTANCE CHANGE RATIO (AVERAGE OF 40 PIECES) | 15.5% | 13.2% |

As explained in the foregoing, the thin-film magnetic head in accordance with the present invention can stabilize the direction of magnetization of the pinned layer. Therefore, the head gimbal assembly and hard disk drive comprising this thin-film magnetic head can enhance and stabilize the output of a hard disk drive.

The basic Japanese Application No. 2002-284158 filed on Sep. 27, 2002 is hereby incorporated by reference.

What is claimed is:

1. A thin-film magnetic head comprising:
   an antiferromagnetic layer;
   a pinned layer, formed from a ferromagnetic material, having a direction of magnetization fixed by exchange coupling with said antiferromagnetic layer;
   a free layer, formed from a ferromagnetic material, having a direction of magnetization changeable depending on an external magnetic field; and
   an intermediate layer disposed between said pinned layer and said free layer;
   wherein a sense current flows through at least said intermediate layer and free layer in a layer thickness direction thereof; and
   wherein said pinned layer and antiferromagnetic layer have an identical length in a contact area therebetween in a depth direction from a surface facing a medium, said length being longer than a length of said free layer in said depth direction.

2. A head gimbal assembly comprising a thin-film magnetic head mounted to a gimbal;
   said thin-film magnetic head comprising:
   an antiferromagnetic layer;
   a pinned layer, formed from a ferromagnetic material, having a direction of magnetization fixed by exchange coupling with said antiferromagnetic layer;
   a free layer, formed from a ferromagnetic material, having a direction of magnetization changeable depending on an external magnetic field; and
   an intermediate layer disposed between said pinned layer and said free layer;
   wherein a sense current flows through at least said intermediate layer and free layer in a layer thickness direction thereof; and
   wherein said pinned layer and antiferromagnetic layer have an identical length in a contact area therebetween in a depth direction from a surface facing a medium, said length being longer than a length of said free layer in said depth direction.

3. A hard disk drive comprising a hard disk writable with magnetic information, and a thin-film magnetic head for reading said magnetic information from said hard disk;

said thin-film magnetic head comprising:

an antiferromagnetic layer;

a pinned layer, formed from a ferromagnetic material, having a direction of magnetization fixed by exchange coupling with said antiferromagnetic layer;

a free layer, formed from a ferromagnetic material, having a direction of magnetization changeable depending on an external magnetic field; and an intermediate layer disposed between said pinned layer and said free layer;

wherein a sense current flows through at least said intermediate layer and free layer in a layer thickness direction thereof; and wherein said pinned layer and antiferromagnetic layer have an identical length in a contact area therebetween in a depth direction from a surface facing a medium, said length being longer than a length of said free layer in said depth direction.

4. A thin-film magnetic head comprising:

an antiferromagnetic layer;

a pinned layer, formed from a ferromagnetic material, having a direction of magnetization fixed by exchange coupling with said antiferromagnetic layer;

a free layer, formed from a ferromagnetic material, having a direction of magnetization changeable depending on an external magnetic field; and an intermediate layer disposed between said pinned layer and said free layer;

wherein a sense current flows through at least said intermediate layer and free layer in a layer thickness direction thereof; and wherein said pinned layer and antiferromagnetic layer have an identical length in a contact area therebetween in a depth direction from a surface facing a medium, said length being longer than a length of said contact area in a width direction thereof.

5. A head gimbal assembly comprising a thin-film magnetic head mounted to a gimbal;

said thin-film magnetic head comprising:

an antiferromagnetic layer;

a pinned layer, formed from a ferromagnetic material, having a direction of magnetization fixed by exchange coupling with said antiferromagnetic layer;

a free layer, formed from a ferromagnetic material, having a direction of magnetization changeable depending on an external magnetic field; and an intermediate layer disposed between said pinned layer and said free layer;

wherein a sense current flows through at least said intermediate layer and free layer in a layer thickness direction thereof; and wherein said pinned layer and antiferromagnetic layer have an identical length in a contact area therebetween in a depth direction from a surface facing a medium, said length being longer than a length of said contact area in a width direction thereof.

6. A hard disk drive comprising a hard disk writable with magnetic information, and a thin-film magnetic head for reading said magnetic information from said hard disk;

said thin-film magnetic head comprising:

an antiferromagnetic layer;

a pinned layer, formed from a ferromagnetic material, having a direction of magnetization fixed by exchange coupling with said antiferromagnetic layer;

a free layer, formed from a ferromagnetic material, having a direction of magnetization changeable depending on an external magnetic field; and an intermediate layer disposed between said pinned layer and said free layer;

wherein a sense current flows through at least said intermediate layer and free layer in a layer thickness direction thereof; and wherein said pinned layer and antiferromagnetic layer have an identical length in a contact area therebetween in a depth direction from a surface facing a medium, said length being longer than a length of said contact area in a width direction thereof.

7. The thin-film magnetic head according to claim 4, wherein said length is longer than a length of said free layer in said depth direction.

8. The head gimbal assembly according to claim 5, wherein said length is longer than a length of said free layer in said depth direction.

9. The hard disk drive according to claim 6, wherein said length is longer than a length of said free layer in said depth direction.

* * * * *